US009067836B2

(12) United States Patent
Lory et al.

(10) Patent No.: US 9,067,836 B2
(45) Date of Patent: Jun. 30, 2015

(54) MEDICINAL PLANT FERTILIZING SOIL

(71) Applicants: Bernie M. Lory, Montague Township, MI (US); Randy R. Artibee, Blue Lake Township, MI (US); Swan E. Swanson, Whitehall Township, MI (US)

(72) Inventors: Bernie M. Lory, Montague Township, MI (US); Randy R. Artibee, Blue Lake Township, MI (US); Swan E. Swanson, Whitehall Township, MI (US)

( * ) Notice: Subject to any disclaimer, the term of this patent is extended or adjusted under 35 U.S.C. 154(b) by 0 days.

(21) Appl. No.: 13/846,861

(22) Filed: Mar. 18, 2013

(65) Prior Publication Data

US 2014/0260465 A1    Sep. 18, 2014

(51) Int. Cl.
*C05F 3/02* (2006.01)
*C05B 17/00* (2006.01)
*C05D 9/00* (2006.01)
*A01G 9/10* (2006.01)

(52) U.S. Cl.
CPC . *C05B 17/00* (2013.01); *C05D 9/00* (2013.01); *A01G 9/1086* (2013.01)

(58) Field of Classification Search
CPC ............................................... C05F 3/02
USPC ....................................... 71/11–27
See application file for complete search history.

(56) References Cited

U.S. PATENT DOCUMENTS

| | | | | |
|---|---|---|---|---|
| 3,172,752 | A * | 3/1965 | Pierce | 71/62 |
| 3,894,355 | A * | 7/1975 | Carothers | 47/48.5 |
| 4,337,077 | A * | 6/1982 | Rutherford | 71/9 |
| 6,074,988 | A * | 6/2000 | King et al. | 504/187 |
| 6,460,290 | B1 * | 10/2002 | Moore et al. | 47/48.5 |
| 6,645,267 | B1 * | 11/2003 | Dinel | 71/11 |
| 6,826,866 | B2 * | 12/2004 | Moore et al. | 47/48.5 |
| 2003/0089152 | A1 * | 5/2003 | Yelanich et al. | 71/23 |
| 2009/0241624 | A1 * | 10/2009 | Audet | 71/15 |
| 2013/0019813 | A1 * | 1/2013 | Rubin et al. | 119/712 |
| 2013/0079224 | A1 * | 3/2013 | Smith et al. | 504/101 |

* cited by examiner

*Primary Examiner* — Wayne Langel

(57) ABSTRACT

A method of preparing a pre-mix composition for delivering a pro-growth medium to promote an enhanced growth pattern for particular plants, and in particular, medicinal plants and herbs.

18 Claims, No Drawings

MEDICINAL PLANT FERTILIZING SOIL

REFERENCE TO RELATED APPLICATIONS

This application claims the benefit of the filing date of U.S. Provisional Application No. 61/685,403, filed Mar. 17, 2013, entitled Medicinal Plant Fertilizing Soil, the entirety of which is incorporated herein by reference.

FIELD OF INVENTION

Disclosed herein is a method of preparing a pre-mix composition for delivering a pro-growth medium to promote an enhanced growth pattern for particular plants, and in particular medicinal plants and herbs.

BACKGROUND

Many pre-mix compositions have been utilized over the years to enhance plant growth. Many of these compositions utilize various components including, for example, various peats and sphagnum. They also utilize various fertilizers and plant foods with their mixes to enhance the growth of certain plants and herbs. With new demands for particular medicinal plants and herbs, the need exists for new and specific compositions containing the right makeup of certain fertilizers and plant foods to enhance the growth of these types of plants.

DETAILED DESCRIPTION OF THE INVENTION

Described herein is a pre-mixture composition comprising a mixture of various components including vermiculite, perlite, peat, sphagnum, blood meal, and with an addition of a specific fertilizer and plant food comprising guano, and in particular, fossilized guano, having a long term and slow release breakdown characteristic within the pre-mixture composition.

In the preferred embodiment the pre-mixture composition would have a make-up of 20% vermiculite, 20% perlite, 5% sterilized peat, 46% sphagnum, 4% lime, 1.7% blood meal and 3.3% of a guano based fertilizer. In one alternative embodiment the composition of guano fertilizer might make up a range of 6.6% to 1.65% of the pre-mixture. In another embodiment the sphagnum utilized in the pre-mixture might be made up of Canadian sphagnum. In various embodiments the concentration of vermiculite, perlite and/or sphagnum might vary as much as plus or minus 10% of the pre-mixture composition. In one embodiment wood ash might be substituted for lime. Any suitable PH conditioner might be utilized however. In an alternative embodiment the pre-mixture composition might include a wetting agent such as, for example, polymers.

In various embodiments a higher percentage of blood meal could be utilized in the pre-mix, comprising as much as 20-25% of the mix. Furthermore the mix could have the makeup be changed by adding 5-20% more vermiculite and 5-25% more perlite. In another embodiment, coconut coir could be used to replace the sphagnum peat moss. coconut coir could also be used to replace the composted Michigan peat. Just about any organically sourced ingredient could be added to and or replace any of the materials in the mix in a reasonable amount as to not overwhelm the other organic materials used in the mix. For example, tree by-products might be utilized.

In the preferred embodiment the guano based fertilizer would have a concentration of 60% fossilized guano. In an alternative preferred embodiment the guano based fertilizer would be comprised of 60% fossilized guano, 10% bone meal, 20% rock phosphate, and 10% glauconite such as, for example, a fossilized marine deposit commonly referred to as green sand. Preferably the guano utilized would be seabird guano. Preferably a mix of 50% Peruvian seabird guano and 50% Chilean seabird guano would comprise the 60% guano utilized in the guano based fertilizer. In an alternative embodiment the type of guano in the guano based fertilizer might be all Peruvian seabird guano or might be all Chilean seabird guano. In an alternative embodiment the type of guano in the guano based fertilizer might be Chilean fossilized seabird guano. Any type of seabird guano or fossilized seabird guano might be utilized however, such as, for example, Korean seabird guano. In an alternative embodiment the concentration of seabird guano in the guano based fertilizer might be as much as 80% or as low as 40%. Any concentration of seabird guano could be utilized however. In an alternative embodiment the guano might consist of bat guano. In another embodiment the 10% glauconite utilized in the guano based fertilizer could be in higher concentration up to 30%. In another embodiment no glauconite would be utilized. In an alternative embodiment concentration of the rock phosphate in the guano based fertilizer might be reduced and would be replaced by bone meal, or eliminated entirely.

While the fundamental features of the novel nature of the invention have been disclosed herein it should be understood that various aspects of the invention may be made by those skilled in the art without departing from the spirit and scope of the invention. Accordingly, all such modifications or variations are included in the scope of the invention as defined by the claims.

What is being claimed is:

1. Pre-mixture fertilized soil composition, wherein the composition comprises;
   vermiculite,
   perlite,
   sterilized peat,
   sphagnum,
   lime,
   blood meal, and
   a fossilized seabird guano based fertilizer supplement composition
   wherein, the fossilized seabird guano based supplement composition consists of a mixture of fossilized seabird guano, bone meal, phosphate, and glauconite.

2. Pre-mixture fertilized soil composition of claim 1 wherein the concentration of the pre-mixture fertilized soil composition comprises;
   20% vermiculite,
   20% perlite,
   5% sterilized peat,
   46% sphagnum,
   4% lime,
   1.7% blood meal, and
   3.3% of the fossilized seabird guano based fertilizer supplement composition
   wherein, the fossilized seabird guano based supplement composition consists of a mixture of fossilized seabird guano, bone meal, phosphate, and glauconite.

3. Pre-mixture fertilized soil composition of claim 1 wherein the fossilized seabird guano based fertilizer supplement composition would have a concentration of 60% fossilized seabird guano.

4. Pre-mixture fertilized soil composition of claim 1 wherein the fossilized seabird guano utilized in the fossilized seabird guano based fertilizer supplement composition is fossilized Peruvian seabird guano.

5. Pre-mixture fertilized soil composition of claim 1 wherein the fossilized seabird guano utilized in the fossilized seabird guano based fertilizer supplement composition is fossilized Chilean seabird guano.

6. Pre-mixture fertilized soil composition of claim 1 wherein the fossilized seabird guano utilized in the fossilized seabird guano based fertilizer supplement composition is comprised of a mix of fossilized Peruvian seabird guano and fossilized Chilean seabird guano.

7. Pre-mixture fertilized soil composition of claim 1 wherein the concentration of the fossilized seabird guano based fertilizer supplement composition comprises;
60% fossilized seabird guano,
10% bone meal,
20% rock phosphate,
and 10% glauconite.

8. Pre-mixture fertilized soil composition of claim 1 wherein the concentration of the fossilized seabird guano based fertilizer supplement composition comprises;
60% fossilized seabird guano,
25% bone meal,
5% rock phosphate,
and 10% glauconite.

9. Pre-mixture fertilized soil composition of claim 1 wherein the concentration of the fossilized seabird guano based fertilizer supplement composition comprises;
60% fossilized seabird guano,
10% bone meal,
5% rock phosphate,
and 25% glauconite.

10. Pre-mixture fertilized soil composition, wherein the composition comprises;
vermiculite,
perlite,
tree by products,
sphagnum,
lime,
blood meal, and
a fossilized seabird guano based fertilizer supplement composition
wherein, the fossilized seabird guano based supplement composition consists of a mixture of fossilized seabird guano, bone meal, phosphate, and glauconite.

11. Pre-mixture fertilized soil composition of claim 10 wherein the concentration of the pre-mixture fertilized soil composition comprises;
20% vermiculite,
20% perlite,
5% tree by products,
46% sphagnum,
4% lime,
1.7% blood meal, and
3.3% of a fossilized seabird guano based fertilizer supplement composition,
wherein, the fossilized seabird guano based supplement composition consists of a mixture of fossilized seabird guano, bone meal, phosphate, and glauconite.

12. Pre-mixture fertilized soil composition of claim 10 wherein the concentration of the fossilized seabird guano based fertilizer supplement composition comprises;
60% fossilized seabird guano,
10% bone meal,
20% rock phosphate,
and 10% glauconite.

13. Pre-mixture fertilized soil composition, wherein the composition comprises a mixture of organically sourced ingredients including a concentration of fossilized seabird guano based fertilizer supplement composition
wherein, the fossilized seabird guano based supplement composition consists of a mixture of fossilized seabird guano, bone meal, phosphate, and glauconite.

14. Pre-mixture fertilized soil composition of claim 13 wherein the concentration of the fossilized seabird guano based fertilizer supplement composition comprises;
60% fossilized seabird guano,
10% bone meal,
20% rock phosphate,
and 10% glauconite.

15. Pre-mixture fertilized soil composition of claim 13 wherein the fossilized seabird guano utilized in the fossilized seabird guano based fertilizer supplement composition is fossilized Peruvian seabird guano.

16. Pre-mixture fertilized soil composition of claim 13 wherein the fossilized seabird guano utilized in the fossilized seabird guano based fertilizer supplement composition is fossilized Chilean seabird fossilized guano.

17. Pre-mixture fertilized soil composition of claim 13 wherein the concentration of the fossilized seabird guano based fertilizer supplement composition comprises;
60% fossilized seabird guano,
25% bone meal,
5% rock phosphate,
and 10% glauconite.

18. Pre-mixture fertilized soil composition of claim 13 wherein the concentration of the fossilized seabird guano based fertilizer supplement composition comprises;
60% fossilized seabird guano,
10% bone meal,
5% rock phosphate,
and 25% glauconite.

* * * * *